COLOR TELEVISION RECEIVER

Filed July 25, 1952 2 Sheets-Sheet 1

CHARLES H. HEUER
JOHN L. RENNICK
*INVENTORS.*

BY Francis W. Crotty

THEIR ATTORNEY.

COLOR TELEVISION RECEIVER

Filed July 25, 1952 2 Sheets-Sheet 2

CHARLES H. HEUER
JOHN L. RENNICK
INVENTORS.

BY Francis W. Crotty
THEIR ATTORNEY.

United States Patent Office 2,823,254

Patented Feb. 11, 1958

2,823,254

COLOR TELEVISION RECEIVER

Charles H. Heuer, Winnetka, and John L. Rennick, Elmwood Park, Ill., assignors to Zenith Radio Corporation, a corporation of Illinois Application July 25, 1952, Serial No. 300,894

4 Claims. (Cl. 178—5.4)

Figure 1:
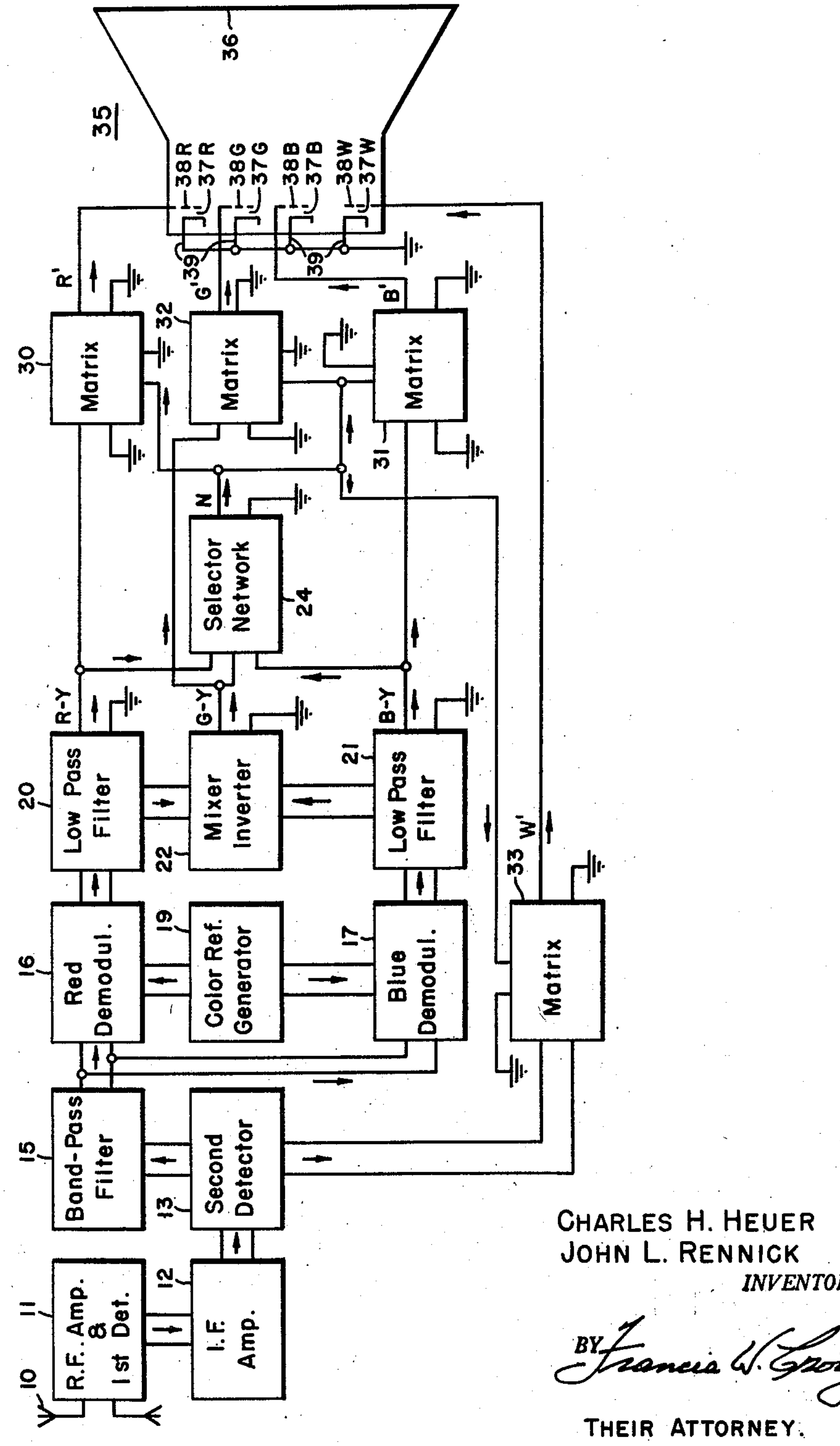

This invention relates to a new and improved color television receiver. The invention is particularly useful when employed in a receiver for a color telecast of the general type currently proposed by the National Television System Committee, and will therefore be described in that connection.

In the color television system formulated by the National Television System Committee, commonly referred to as the NTSC System, the color and luminance information pertaining to a scanned image are segregated and transmitted as individual signals interleaved within a portion of the frequency spectrum. At the transmitter, three color-image signals representative of a scanned image are combined in a fixed ratio to form a brightness signal. At the same time, a plurality of color-difference signals are developed, each individually corresponding to the amplitude difference between one of the color-image signals and a predetermined portion of the brightness signal, that predetermined portion presently being established as the complete brightness signal. A system of this basic type is described in the copending application of John L. Rennick, Serial Number 215,761, filed March 15, 1951, and assigned to the same assignee as the present application. Accordingly, the color-difference signals represent the hue and saturation values of the colors included in the image, whereas the brightness signal represents the luminance of the various parts of the image. Although the ultimate transmission standards have not as yet been determined, but are still somewhat flexible, it is generally considered that the brightness or monochrome signal and the essential information representing two of the color-difference signals will be transmitted, since the third color-difference signal may then be derived at the receiver, due to the fixed mathematical relationship established between the monochrome signal and each of the color-difference signals.

In constructing a color television receiver for utilizing a telecast of this general type, it has been customary to provide means for deriving the monochrome signal and the three color-difference signals; these signals are then employed directly to control the operation of an image-reproducing system which may include either a single tri-color cathode-ray tube, having either three electrode systems or a single electrode system, such as that disclosed in the copending application of John L. Rennick, Serial Number 226, 125, filed May 14, 1951, and assigned to the same assignee as the present invention, or three single-color cathode-ray tubes and an optical system for combining the three colored images produced. In either of these image-reproducing arrangements, considerable difficulty is encountered with respect to mis-registration and color fringing. This situation is emphasized by the fact that all of the reproducing devices employed utilize the high definition monochrome signal, with the result that any registration variations are accentuated. The problem becomes particularly acute when the subject-matter of the image is essentially uncolored; e. g., where the scanned image is composed mostly of shades of black and white. When the latter type of image is transmitted, any registration misalignment present in the system may cause color fringing which appears as colored lines, dots, or other elements in the reproduced image, since white light is developed in that image by a combination of the output of three primary-color light sources.

An analogous situation has been recognized in the graphic arts and photography fields and has been partly solved by the utilization of the so-called "four-color" method of reproduction. In this method, four separation images are employed, three of which are referred to as chromatic or color images while the fourth is termed an achromatic image. The corresponding terminology with respect to actual printing describes the chromatic images as "color printers" and the monochrome as a "black printer." The black printer represents those portions of the picture or image containing equally effective amounts or contributions of the three primary colors, whereas the color printers used in this process correspond to the color content of the image after the achromatic equal contribution content has been deleted.

Electronic means for deriving the information necessary to form the four separation images required by the four-color method are known in the printing art; however, they are not readily applicable to television apparatus because of several basic fundamental differences in the color systems. For example, the graphic or photographic processes are based on a subtractive color system, whereas color television is necessarily predicated upon an additive color system. Furthermore, the graphic methods are not subject to the restrictions and qualifications as to transmission frequency bandwidth which are present in color television. Although all of the essential color information for reproducing an image by the three-color method is present in the telecast available to a color television receiver, this data is not segregated in individual and distinct color elements, having the same degree of definition, as is the normal situation in color photography. In addition, the monochrome or brightness signal, which is an essential element of the NTSC standard specifications and is included in order to render the system compatible with present day monochrome television equipment, is not present in the graphic systems.

Several proposals have been advanced in the color television field for developing at the transmitter an achromatic key signal for defining the black and white or gray elements of a color image. However, all of these proposals necessarily entail either a prohibitive increase in the frequency bandwidth required for the transmission of the telecast or else are limited to a sequential color system. In both cases the resulting transmission system is incompatible with current monochrome television equipment and sharply limits the number of transmission bands which can be included within the available frequency spectrum.

It is an object of this invention, therefore, to provide a color television receiver for utilizing a telecast generally corresponding to the proposed NTSC type of signal which will substantially eliminate color fringing in the reproduced image.

It is a further object of this invention to provide a color television receiver which inherently minimizes the effects of misregistration due to misalignment of the image-reproducing components of the receiver.

It is a corollary object of the invention to provide a television receiver which produces a four-color image in response to a telecast containing three-color information.

It is an additional object of the invention to provide a color television receiver which is adaptable to a system compatible with present day monochrome equipment and which is also capable of effecting satisfactory reproduction of a monochrome telecast transmitted in accordance with currently established standards.

It is a further object of the invention to provide a color television receiver, operative in accordance with the above described four-color method, which is relatively simple and expedient to construct and economical to manufacture.

The present invention provides a color television receiver for utilizing a received telecast including a brightness signal representing a combination of three color-image signals and further including a plurality of color-difference signals relatively free of brightness information. The color-difference signals individually correspond to the amplitude difference between one of the color-image signals and a portion of the brightness signal. The receiver includes a first means for utilizing the received telecast to develop the brightness signal and a second means for utilizing the telecast to derive three color-difference signals substantially segregated from the brightness signal and from each other. A selector network is coupled to the second means and receives the three color-difference signals therefrom; this selector network generates a signal operator instantaneously proportional in absolute value to that color-difference signal corresponding to the instantaneously smallest one of the three primary color-image signals. Combining means are coupled to the second means and to the selector network for individually combining each of the three color-difference signals with the signal operator thereby to develop three color-control signals. A matrix is coupled to the first means and to the selector network; this matrix combines the signal operator with the brightness signal to develop a color-desaturation control signal. An image reproducing system, coupled to the combining means and to the matrix, employs the control signals to reproduce a colored image.

Figure 2:
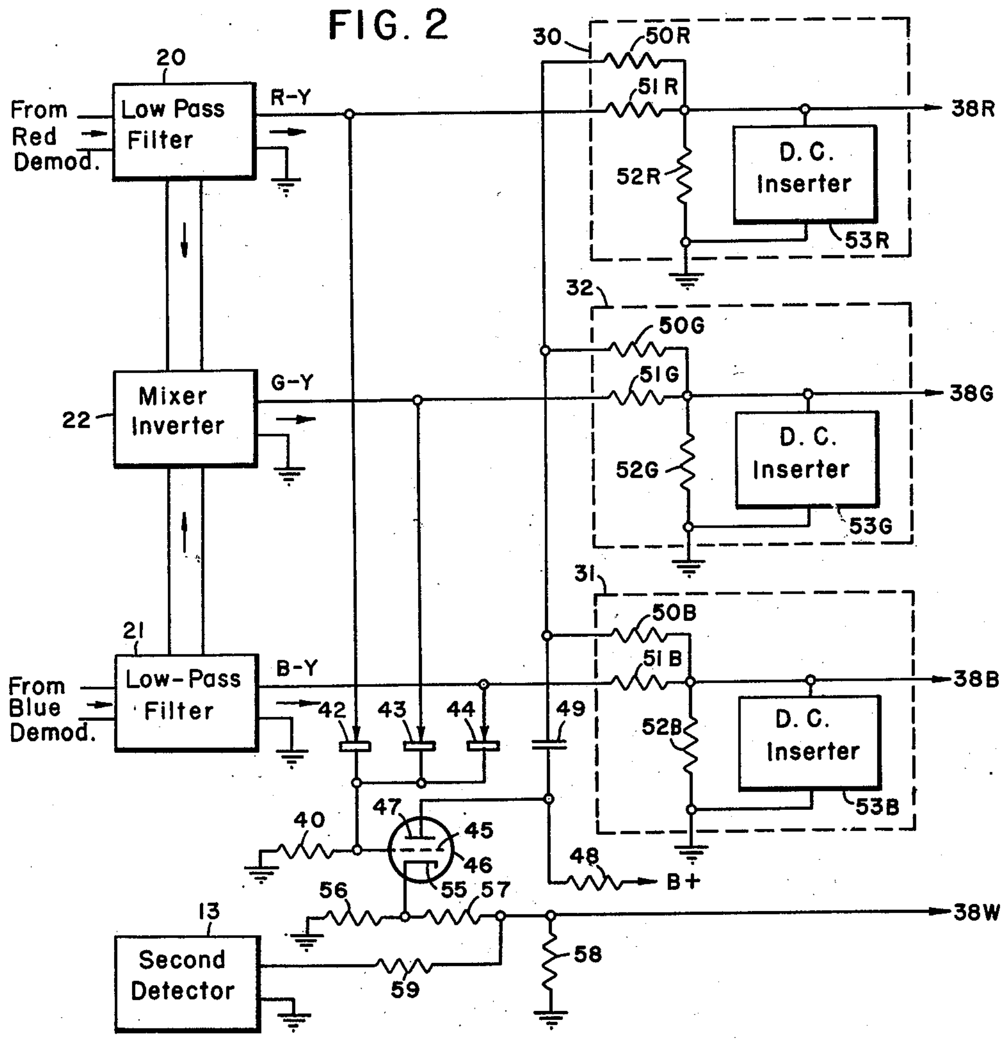
Figure 1A:
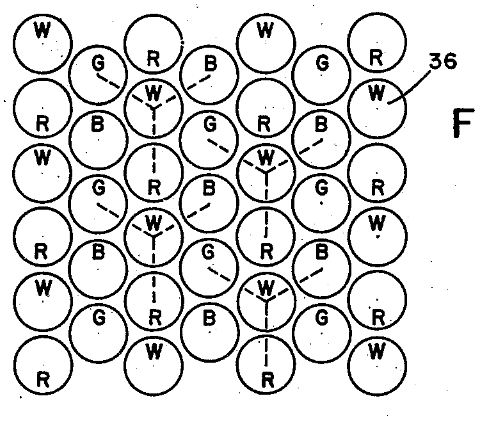

The features of the invention which are believed to be novel are set forth with particularity in the appended claims. The organization and manner of operation of the invention itself, together with further objects and advantages thereof, may best be understood by reference to the following description taken in conjunction with the accompanying drawings, in which:

Figure 1 is a block diagram, partially schematic, of a television receiver embodying the inventive concept; Figure 1A is a schematic sectional diagram of a part of one of the devices illustrated in Figure 1; and Figure 2 is a simplified schematic diagram of a portion of the television receiver of Figure 1.

The color television receiver illustrated in Figure 1 includes an antenna 10, a radio-frequency amplifier and first detector 11, and an intermediate-frequency amplifier 12; these elements are coupled together in series, with the output circuit of intermediate-frequency amplifier 12 coupled to a second detector 13. Two sets of output terminals are provided for second detector 13, one set being connected to a band-pass filter 15. The output stage of filter 15 is coupled to the input circuits of a red demodulator 16 and a blue demodulator 17, and a color reference generator 19 is also coupled to the demodulators. The output circuits of demodulators 16 and 17 respectively are connected to two low-pass filters 20 and 21, and a mixer-inverter 22 is coupled to the two filters. The output stages of low-pass filters 20 and 21 and of mixer 22 are all coupled to a selector network 24; in addition, these output stages are individually connected to three matrices 30, 31 and 32 respectively. Each matrix comprises a network or device for combining two signals to derive a signal representative of their algebraic sum or difference and may take the form of a resistance network or any other suitable type of combining means known to the art. The output circuit of selector network 24 is also coupled to each of the three matrices 30—32. Selector network 24 is also coupled to another matrix 33 which is in circuit with the second set of output terminals of second detector 13.

An image-reproducing system 35 is included in the receiver and comprises a cathode-ray tube having a screen 36 and four electrode systems 37R, 37G, 37B and 37W. Screen 36 is generally similar to any of the well-known types of color-screens employed in cathode-ray television tubes in that it comprises a plurality of groups of elemental areas, such as lots or lines of phosphorescent material, each group exhibiting an electron-bombardment color-radiation response characteristic individually corresponding to one of the primary additive colors; however, an additional group of phosphorescent elements, emitting white light when excited, are interspersed with the color areas to form a consistent "four-color" pattern. An acceptable dot-pattern screen structure for screen 36 is shown in Figure 1A, in which the primary-color phosphor groups are indicated by R, G and B respectively and the white-light emissive areas are designated W. Each of the electrode systems 37 of Figure 1 includes a control electrode, these electrodes being designated 38R, 38G, 38B and 38W respectively. Four cathodes 39 are individually associated with the control electrodes 38 and are connected to a source of reference potential. A deflection system for simultaneously deflecting the cathode-ray beams developed by electrode systems 37 to scan screen 36 is included in image-reproducing system 35 but has been omitted from the drawing for purposes of simplification and clarification. A cathode-ray image-reproducer of this type is described and claimed in the copending application of Charles H. Heuer and John L. Rennick, Serial No. 315,476, filed October 18, 1952, and assigned to the same assignee as the present invention. It will be recognized by those skilled in the art that certain other elements normally present in a television receiver, such as screen biasing and focusing arrangements, have been omitted for similar reasons inasmuch as they form no part of the present invention.

In order fully to comprehend the operation of the receiver of Figure 1, a brief description of the received signal and the quantities or control signals derived in the receiver is desirable. In that description, the following definitions are employed:

R, G, and B are primary color-image signals, including brightness information, representative of the color content of the image to be reproduced and corresponding to the primary colors of an additive color system. Y is a brightness or monochrome signal of the type employed in the NTSC color-television system and represents a combination of the three color-image signals, R, B, and G. E represents the received telecast, exclusive of the transmission carrier frequency signal, and includes both the brightness signal and the color-difference signals. R′, B′, G′ and W′ represent the output signals of matrices 30, 31, 32 and 33 respectively as applied to control electrodes 38R, 38B, 38G and 38W. R–Y, B–Y, and G–Y represent color-difference or chrominance signals including hue and saturation information, and N is a signal operator instantaneously equal in absolute value to the color-difference signal derived from that one of the original color-image signals having the smallest value at any given instant.

A constant-luminance system is incorporated within the NTSC proposal; the basic equation for an approximate constant-luminance system may be expressed as follows:

(1) $$Y=0.1B+0.6G+0.3R$$

According to currently proposed standards, the signal form of the received telecast, disregarding the transmission carrier, may be represented by the equation:

(2) $$E=Y+K[(K_1(R-Y)\sin wt+K_2(B-Y)\cos wt)]$$

in which K, $K_1$, and $K_2$ are all constants and $w$ is a subcarrier signal frequency. It should be noted that these standards also require that Y, the brightness component, be transmitted with the same degree of definition as is present in present-day monochrome telecasts, whereas the definition of the color-difference signals is materially reduced. In accordance with the inventive concept, the following relationships are established:

(3) $R'=(R-Y)+N$ (4) $B'=(B-Y)+N$ (5) $G'=(G-Y)+N$ (6) $W'=Y-N$

A series of calculations based on the above definitions and equations produces the following illustrative results:

*Color to be reproduced*

| Signal Designation (I) | Red (II) | White (III) | Yellow (IV) | Orange (V) | Unsaturated Red-Blue (VI) |
|---|---|---|---|---|---|
| R | 1 | 1 | 1 | 1 | 1 |
| B | 0 | 1 | 0 | 0 | .5 |
| G | 0 | 1 | 1 | .5 | .2 |
| Y | .3 | 1 | .9 | .6 | .47 |
| R–Y | .7 | 0 | .1 | .4 | .53 |
| B–Y | –.3 | 0 | –.9 | –.6 | .03 |
| G–Y | –.3 | 0 | .1 | –.1 | –.27 |
| N | .3 | 0 | .9 | .6 | .27 |
| R′ | 1 | 0 | 1 | 1 | .8 |
| B′ | 0 | 0 | 0 | 0 | .3 |
| G′ | 0 | 0 | 1 | .5 | 0 |
| W′ | 0 | 1 | 0 | 0 | .2 |

It is immediately apparent from the foregoing data that the signal W′ developed in matrix 33 is equal in absolute value to the smallest of the three color-image signals R, B and G and therefore represents the amount of color-desaturated or white light present in each instantaneous element of the reproduced image. Signal W′ may therefore be termed a color-desaturation control signal. It is further apparent that each of the quantities R′, B′ and G′ may be defined as follows:

(8) $R'=R-W'$ (9) $B'=B-W'$

(10) $G'=B-W'$

When the receiver of Figure 1 is placed in operation, a telecast comprising a carrier wave modulated with information corresponding to Equation 2 is received at antenna 10, amplified and heterodyned in system 11 to develop an intermediate frequency signal and applied to intermediate-frequency amplifier 12. The intermediate frequency signal, after amplification, is applied to second detector 13, wherein it is demodulated to derive a composite signal corresponding to Equation 2.

The output signal of detector 13 is supplied to band-pass filter 15 which effectively blocks out the majority of the monochrome signal "Y" and furnishes the remaining information, primarily representative of color data, to demodulators 16 and 17. In red demodulator 16, the information contained in the output signal from band-pass filter 15 is demodulated and is then applied to low-pass filter 20 to derive the color-difference signal represented as R–Y. The signal developed in color reference generator 19 is supplied to red demodulator 16 to enable the demodulator to carry out this operation; at the same time, a color reference signal is applied to blue demodulator 17 to effect detection of the blue chrominance information contained in the received telecast. The output of blue demodulator 17 is supplied to low-pass filter 21 to derive the blue color-difference signal B–Y. Color-difference signals R–Y and B–Y, which comprise the output signals of filters 20 and 21 respectively, are applied to mixer-inverter 22, which combines these two signals to develop the third color-difference signal G–Y. The operation and construction of all of these elements is generally well understood in the art and any effective means for deriving the color-difference signals may be employed without adversely affecting the operation of the invention.

The color-difference signals developed in circuits 20, 21 and 22 are all supplied to selector network 24. The selector network compares the instantaneous values of those signals and derives therefrom a signal representative of signal operator "N" as defined above. Signal "N," which is instantaneously equal in absolute value to that color-difference signal corresponding to the instantaneously smallest of the three primary color-image signals R, G, and B, is applied to each of the three matrices 30, 31 and 32. In matrix 30, the signal operator N received from network 24 is combined with the color-difference signal R–Y received from low-pass filter 20 to develop a color-control signal corresponding to the algebraic sum of R–Y and N. This latter color-control signal is equivalent to the signal R′ as defined above. Similarly, matrices 32 and 31 combine signal operator N with color-difference signals G–Y and B–Y to develop color-control signals G′ and B′ respectively. Matrices 30—32 thus represents a combining means for individually combining each of the three color-difference signals with the signal operator to develop the three color-control signals and may take such form as is necessary to carry out this operation.

The signal operator N, developed in network 24, is also applied to matrix 33, and, at the same time, the signal developed in second detector 13 is likewise supplied to the matrix. The brightness or monochrome signal Y predominates in the output of the second detector and the signal may therefore be considered as the equivalent of the monochrome signal. If preferred, a low-pass filter may be included in circuit between second detector 13 and matrix 33 to remove some of the chromaticity information from the output signal of the detector, but this is not essential. In matrix 33, signal operator N and brightness signal Y are combined to develop a color-desaturation control signal equivalent to W′, which, by definition, is equal to Y–N. Control signal W′ is applied to control electrode 38W to modulate the intensity of the cathode-ray beam developed by electrode system 37W. The beam from system 37W is aligned to impinge upon elemental areas W of screen 36, Figure 1A, which, when excited, emit an achromatic or white light. At the same time, the signals R′, G′ and B′ are applied to control electrodes 38R, 38G and 38B respectively and are employed to regulate the intensity of the cathode-ray beams developed by electrode systems 37R, 37G, and 37B, which are focused upon the red, green and blue groups R, G, and B of screen 36.

The signal W′ represents all of the picture information which is essentially achromatic; that is to say, it represents completely those portions of the image in which the three primary additive colors are equally effective. This is borne out by the figures derived for white light, table (7), column III, which indicate a complete absence of any color control signal R′, B′, or G′ for white or monochromatic portions of the picture. This being the case, these monochrome portions of the image are not dependent upon a combination of different color emissive areas or the alignment of a plurality of beam generating systems associated with those areas and therefore color registration deficiencies in these parts of the image are virtually eliminated. In addition, the same signal W′ contains part of the information relating to the more saturated portions of the picture in which the three primary colors are all present but are not equally effective. The image representative of these areas is therefore developed by a cómibnation of white or achromatic light plus one or two of the primary colors. The reproduction of these areas is partially controlled by the white light content, and color fringing is therefore minimized. Similarly, when the receiver is employed in conjunction with a standard monochrome telecast, electrode systems 37R, 37G, and 37B receive no signal and, as a result, the image is reproduced by means of electrode system 37W alone. The definition of the monochrome image developed is dependent only upon the alignment of electrode system 37W with the achromatic or white light emissive portions of screen 36 and does not include any contribution from the primary color portions of the screen; consequently, color registration deficiencies are virtually eliminated.

Signals R', B', and G', applied to the color electrode systems, represent relatively low-definition information, and therefore the effect of any misalignment of the cathode ray beams generated by these systems is minimized in comparison with the more sharply defined achromatic information represented by desaturation signal W'. Inasmuch as electrode systems 37R, 37G and 37B are responsive only to low-definition information, the construction and alignment of these systems is not as critical in determining the observed quality of the reproduced image as is that of electrode system 37W; consequently, manufacturing and assembly economies in the construction of the color-control electrode systems may be realized without adversely affecting the results achieved.

The apparatus illustrated in Figure 2 comprises a simple and inexpensive system capable of carrying out the operational functions of selector network 24, the combining means comprising matrices 30–32 and matrix 33. Low-pass filters 20 and 21 and mixer-inverter 22 are individualy coupled to a common resistor 40 through three rectifier devices 42, 43 and 44. Rectifiers 42–44 may be vacuum tubes, such as diodes, or any other suitable type of rectifier. Resistor 40 is also connected to the control electrode 45 of an electron-discharge device 46 and to a plane of reference potential. The anode 47 of device 46 is coupled to a source of unidirectional potential B+ through a resistor 48. Anode 47 is also coupled to a resistor 50R through a capacitor 49; resistor 50R is in circuit with control electrode 38R of image device 35. Low-pass filter 20 is coupled to control electrode 38R through another resistor 51R and the common connection between resistors 50R and 51R and control electrode 38R is connected to a plane of reference potential through a resistor 52R. A direct-current inserter 53R is connected across resistor 52R. Resistors 50R, 51R, and 52R, in conjunction with inserter 53R, comprise matrix 30, as indicated by the dash outline.

Matrices 31 and 32, each of which comprises a resistance network equivalent to that described above in conjunction with matrix 30, are employed to couple anode 47 to control electrodes 38B and 38G respectively and also to couple filter 21 and mixer 22 to these same control electrodes. Cathode 55 of device 46 is connected to ground through a resistor 56 and to control electrode 38W through a resistor 57. Another resistor 59, and a resistor 58, coupled to ground potential, complete a resistor network comprising matrix 33 coupled to control electrode 38W.

The output signals of filters 20 and 21 and mixer 22 correspond to the color difference signals R–Y, B–Y and G–Y respectively, and should contain the correct direct-current reference level as transmitted. If this reference level is removed in the demodulation process or in any of the other preliminary stages of the receiver, it may be restored by direct-current insertion effected through any of the several suitable means known in the art. When the color-difference signals are applied to rectifiers 42—44, the instantaneous voltage appearing across resistor 40 represents that signal having the greatest negative excursion from the reference level. As will be apparent from the table of calculations (7) shown above, the voltage across resistor 40 represents the color-difference signal derived from the instantaneously smallest color-image signal. The voltage appearing across resistor 40 controls the magnitude of the current flowing in device 46 and therefore controls the current flowing through resistor 48. The current through resistor 50R is therefore instantaneously representative of the signal operator N, which has been defined as having an absolute value equal to that of the color-difference signal corresponding to that one of the three primary color-image signals having the smallest instantaneous contribution to the picture.

At the same time, the current flowing through resistor 51R is representative of the instantaneous value of the color-difference signal R–Y. The resistance network or matrix comprising resistors 50R, 51R and 52R functions as an adding circuit in that the current flowing through resistor 52R represents the algebraic sum of the current flowing in resistors 50R and 51R. The voltage drop across resistor 52R, which is the effective control voltage applied to electrode 38R, represents the color-difference signal, R–Y, plus the signal operator N, and is therefore equivalent to color-control signal R' as defined in Equation 3. Similarly, the resistance networks coupled to device 46 and filter 21 and inverter device 22 perform the necessary addition for combining signal operator N with the color-difference signals B–Y and G–Y and therefore develop signals B' and G', as defined in Equations 4 and 5, which are applied to control electrodes 38B and 38G respectively. Because signal operator N is equal in absolute value to one of the color-difference signals but is of opposite polarity, the voltage applied to one of the control electrodes 38 is at all times equal to zero; in other words, only two of the color electron beams of cathode-ray tube 35 controlled by electrodes 38R, 38G, and 38B are effective at any given instant. Inasmuch as the output of electron discharge device 46 is capacitively coupled, through capacitor 49, to the current adding networks comprising matrices 30, 31, and 32, the direct-current component of signal operator N is not transferred. This unipotential component is restored by means of direct-current inserters 53R, 53G, and 53B; the direct-current restoration may be effected by any of the suitable means known in the art. Maintenance of the desired direct-current level for both the color-difference signals and N prevents effective operation of the color-electrode systems 37R, 37B, and 37G in the absence of a received color signal and thus precludes the appearance of color contamination in reproduction of a received black-and-white telecast.

The signal derived from cathode resistor 56 and applied to resistor 47 is likewise representative of signal operator N, but is of opposite polarity from the signal applied to resistor 48. In the resistor network comprising elements 57–59, the signal operator is algebraically combined with the brightness or monochrome component of the received telecast, Y, so that the instantaneous voltage appearing across resistor 58 represents the quantity Y–N. However, Y–N is equal to the desired desaturation or whiteness signal W' as defined by Equation 6; this desaturation control signal is applied to control electrode 38W and therefore regulates the achromatic content of the image reproduced on screen 36 of device 35. As will be apparent from the foregoing description, signal W' contains all the necessary high definition information representative of the image and also contains all of the information relating to that part of the image containing equal contributions from the three primary colors. Signal W' therefore represents virtually all of the information to which the human eye is most sensitive insofar as shading or outline definition are concerned.

While particular embodiments of the present invention are shown and described, it is apparent that changes and modifications may be made without departing from the invention in its broader aspects, and, therefore, the aim in the appended claims is to cover all changes and modifications which fall within the true spirit and scope of the invention.

We claim:

1. A color television receiver for utilizing a received telecast including a brightness signal representing a combination of three additive primary color-image signals and further including a plurality of color-difference signals individually corresponding to the amplitude difference between one of said color-image signals and a portion of said brightness signal, said receiver comprising: first means for utilizing said received telecast to develop said brightness signal; second means for utilizing said received telecast to derive three of said color-difference signals substantially segregated from said brightness signal and from each other; selector network means coupled to said second means for receiving said three color-difference signals and generating a signal operator instantaneously proportional in absolute value to that color-difference signal corresponding to the instantaneously smallest one of said three primary color-image signals; combining means coupled to said second means and to said selector network for individually combining each of said three color-difference signals with said signal operator to develop three color-control signals; a matrix couped to said first means and to said network for combining said signal operator with said brightness signal to develop a color-desaturation control signal; and an image reproducing system coupled to said combining means and to said matrix for employing said control signals to reproduce an image.

2. A color television receiver for utilizing a received telecast including a brightness signal representing a combination of three primary additive color-image signals and further including a plurality of color-difference signals individually corresponding to the amplitude difference between one of said color-image signals and a portion of said brightness signal, said receiver comprising; first means for utilizing said received telecast to develop said brightness signal; second means for utilizing said received telecast to derive three of said color-difference signals as amplitude variations about a fixed reference potential, said color-difference signals being substantially segregated from said brightness signal and from each other; selector network means coupled to said second means for receiving said three color-difference signals and generating a signal operator instantaneously proportional in absolute value to that color-difference signal having the greatest instantaneous amplitude of a given polarity with respect to said reference potential plane; combining means coupled to said second means and to said selector network for individually combining each of said three color-difference signals with said signal operator to develop three color-control signals; a matrix coupled to said first means and to said selector network for combining said signal operator with said brightness signal to develop a color-desaturation control signal; and an image-reproducing system coupled to said combining means and to said matrix for employing said control signals to reproduce a colored image.

3. A color television receiver for utilizing a received telecast including a brightness signal representing a combination of three additive primary color-image signals and further including a plurality of color-difference signals individually corresponding to the amplitude difference between one of said color-image signals and a portion of said brightness signal, said receiver comprising: first means for utilizing said received telecast to develop said brightness signal; second means for utilizing said received telecast to derive three of said color-difference signals substantially segregated from said brightness signal and from each other; selector network means coupled to said second means for receiving said three color-difference signals and generating a signal operator instantaneously proportional in absolute value to that color-difference signal corresponding to the instantaneously smallest one of said three primary color-image signals; combining means coupled to said second means and to said selector network for individually combining each of said three color-difference signals with said signal operator to develop three color-control signals; a matrix coupled to said first means and to said selector network for combining said signal operator with said brightness signal to develop a color desaturation control signal; and an image-reproducing system including means coupled to said combining means to receive said color-control signals and control the colored light content of a reproduced image in accordance therewith, said system further including means coupled to said matrix to receive said desaturation control signal and control the achromatic light content of said image in accordance therewith.

4. A color television receiver for utilizing a received telecast including a brightness signal representing a combination of three primary additive color-image signals corresponding to the individual contributions of three additive primary colors in an image and further including a plurality of color-difference signals individually corresponding to the amplitude difference between one of said color-image signals and a portion of said brightness signal, said receiver comprising: first means for utilizing said received telecast to develop said brightness signal; second means for utilizing said received telecast to derive three of said color-difference signals substantially segregated from said brightness signal and from each other; selector network means coupled to said second means for receiving said three color-difference signals and generating a signal operator instantaneously proportional in absolute value to that color-difference signal corresponding to the instantaneously smallest one of said three primary color-image signals; combining means coupled to said second means and to said selector network for individually combining each of said three color-difference signals with said signal operator to develop three color-control signals; a matrix coupled to said first means and to said selector network for combining said signal operator with said brightness signal to develop a color-desaturation control signal; an image-reproducing system for developing an image comprising elemental areas of light corresponding to said three primary additive colors and elemental areas of achromatic light; means included within said image-reproducing system and coupled to said combining means to control the colored light content of said image in accordance with said color-control signals; and further means included within said system and coupled to said matrix to control the achromatic light content of said image in accordance with said color-desaturation control signal.

References Cited in the file of this patent

UNITED STATES PATENTS

| | | |
|---|---|---|
| 2,316,581 | Hardy | Apr. 13, 1943 |
| 2,509,038 | Goldsmith | May 23, 1950 |
| 2,646,463 | Schroeder | July 21, 1953 |
| 2,684,995 | Schroeder | July 27, 1954 |